United States Patent
Sim et al.

(10) Patent No.: US 8,341,109 B2
(45) Date of Patent: Dec. 25, 2012

(54) METHOD AND SYSTEM USING A PROCESSOR FOR REASONING OPTIMIZED SERVICE OF UBIQUITOUS SYSTEM USING CONTEXT INFORMATION AND EMOTION AWARENESS

(75) Inventors: Kwee-Bo Sim, Seoul (KR); Kwang-Eun Ko, Seoul (KR)

(73) Assignee: Chung-Ang University Industry-Academy Cooperation Foundation, Seoul (KR)

( * ) Notice: Subject to any disclaimer, the term of this patent is extended or adjusted under 35 U.S.C. 154(b) by 496 days.

(21) Appl. No.: 12/625,530

(22) Filed: Nov. 24, 2009

(65) Prior Publication Data

US 2010/0228696 A1 Sep. 9, 2010

(30) Foreign Application Priority Data

Mar. 6, 2009 (KR) .................. 10-2009-0019244

(51) Int. Cl.
*G06N 5/02* (2006.01)
(52) U.S. Cl. .................................................. 706/52
(58) Field of Classification Search .............. 706/14, 706/46, 47; 340/573.1
See application file for complete search history.

(56) References Cited

U.S. PATENT DOCUMENTS

2008/0059393 A1* 3/2008 Lee et al. ................. 706/14
2009/0261978 A1* 10/2009 Lee et al. ................. 340/573.1

* cited by examiner

*Primary Examiner* — David R Vincent
*Assistant Examiner* — Ola Olude Afolabi
(74) *Attorney, Agent, or Firm* — IPXLAW Group LLP; Claude A.S. Hamrick

(57) ABSTRACT

A method and system using a processor for reasoning an optimized service of a ubiquitous system using context information and emotion awareness. The system using a processor for reasoning an optimized service of a ubiquitous system includes: a ubiquitous system unit to collect information about surroundings of a user; a context awareness unit to recognize a state of the user based on the information collected in the ubiquitous system unit, and to generate context information; an emotion awareness unit to recognize an emotion of the user based on the information collected in the ubiquitous system unit, and to generate emotion information; a combination unit to combine the context information and the emotion information; and a service selection unit to reason and select a service for the user based on the combination result of the combination unit.

12 Claims, 2 Drawing Sheets

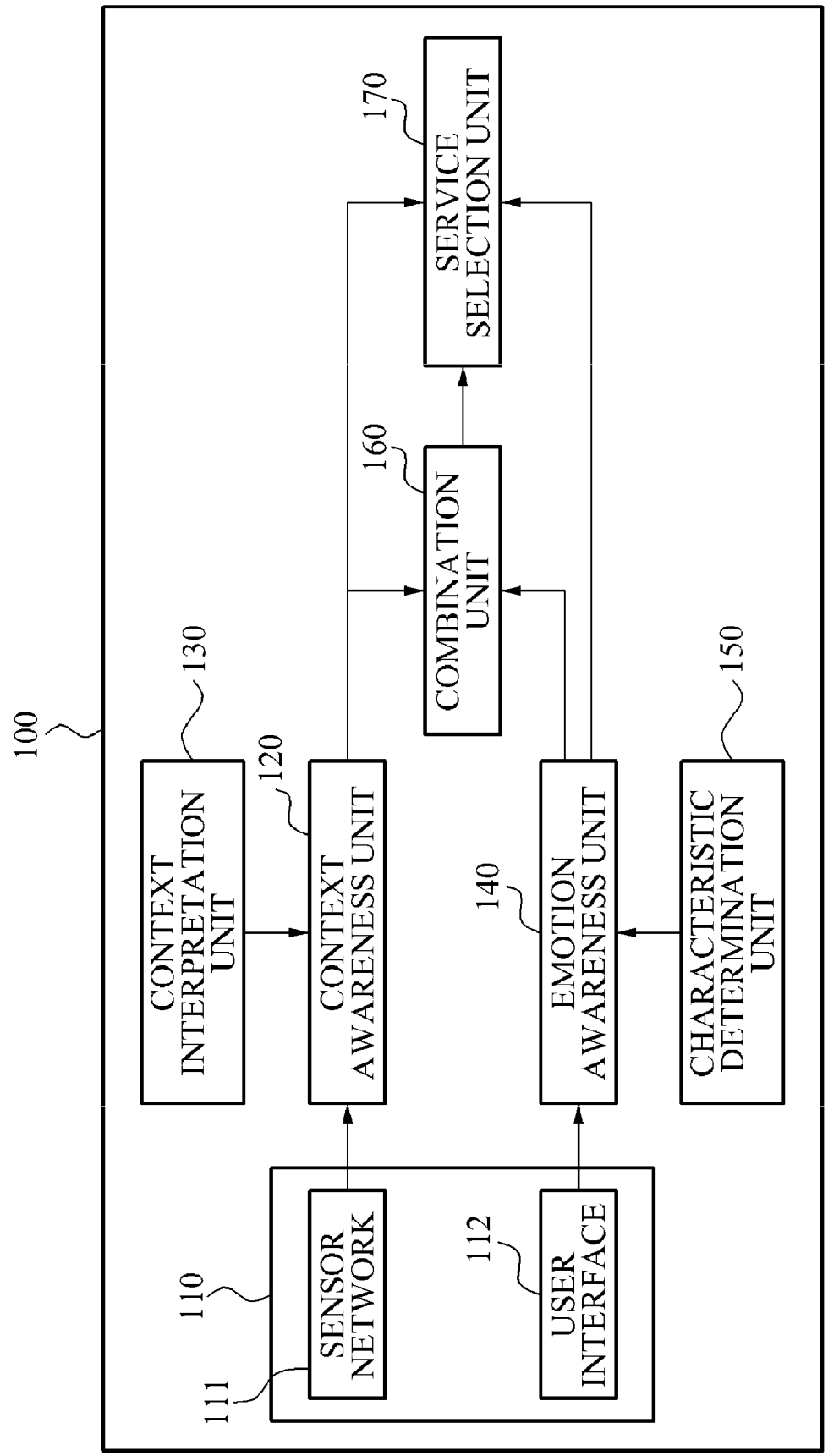

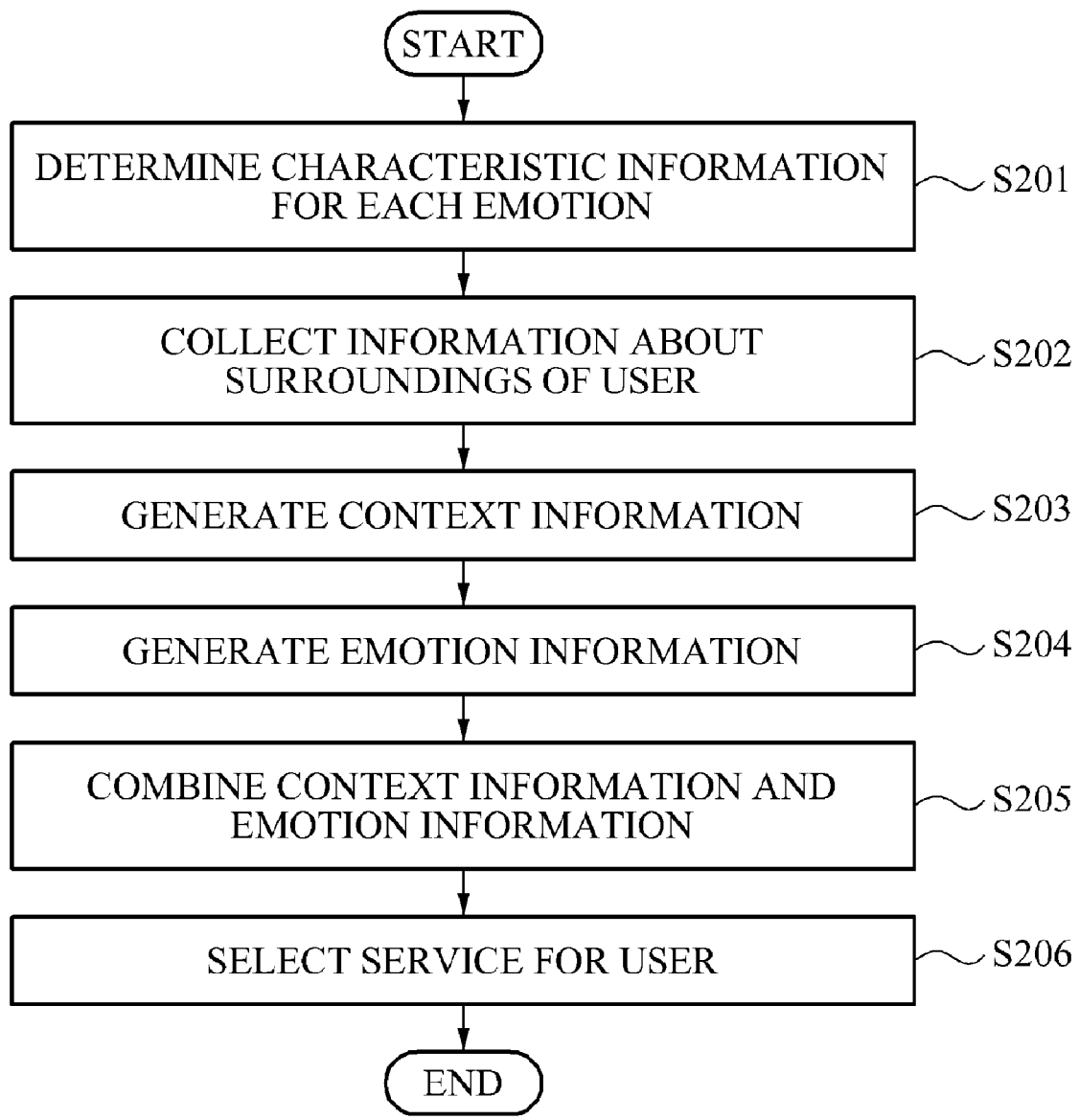

METHOD AND SYSTEM USING A PROCESSOR FOR REASONING OPTIMIZED SERVICE OF UBIQUITOUS SYSTEM USING CONTEXT INFORMATION AND EMOTION AWARENESS

CROSS-REFERENCE TO RELATED APPLICATION

This application claims the benefit of Korean Patent Application No. 10-2009-0019244, filed on Mar. 6, 2009, in the Korean Intellectual Property Office, the disclosure of which is incorporated herein by reference.

BACKGROUND

1. Field of the Invention

The present invention relates to a method and system using a processor for reasoning an optimized service of a ubiquitous system, and more particularly, to a method and system for reasoning an optimized service of a ubiquitous system using context information and emotion awareness.

2. Description of the Related Art

In a conventional art, a method of reasoning a service for a user in a ubiquitous environment may reason a service suitable for the user based on a state of the user such as a location of the user, and the like.

However, people may feel differently about the same service depending on emotion, even when they are located in the same place or act the same.

For example, when a user feels annoyed, the user may be annoyed by a song that the user likes, and may not want to see an image that the user is fond of.

Accordingly, a method and system using a processor for reasoning an optimized service of a ubiquitous system that may recognize an emotion of each user, and provide the users with different services based on the emotion and a state of each of the users, even when each of the users acts the same, may be required.

SUMMARY

An aspect of the present invention provides a method and system using a processor for reasoning an optimized service of a ubiquitous system using context information and emotion awareness that may determine an emotion as well as a state of a user such as a location or a motion of the user, and provide the user with a service, required for the user, based on the emotion and state of the user.

According to an aspect of the present invention, there is provided a system using a processor for reasoning an optimized service of a ubiquitous system, including: a ubiquitous system unit to collect information about surroundings of a user; a context awareness unit to recognize a state of the user based on the information collected in the ubiquitous system unit, and to generate context information; an emotion awareness unit to recognize an emotion of the user based on the information collected in the ubiquitous system unit, and to generate emotion information; a combination unit to combine the context information and the emotion information; and a service selection unit to reason and select a service for the user based on the combination result of the combination unit. The system for reasoning an optimized service of a ubiquitous system may further include a characteristic determination unit to determine characteristic information for each emotion, the characteristic information being used to determine which emotion the user feels, and the emotion awareness unit may compare the characteristic information with the at least one piece of emotion expression information, collected by the user interface, and recognize a current emotional state of the user.

The system for reasoning an optimized service of a ubiquitous system may further include a characteristic determination unit to determine characteristic information for each emotion, the characteristic information being used to determine which emotion the user feels, and the emotion awareness unit may compare the characteristic information with the at least one piece of emotion expression information, collected by the user interface, and recognize a current emotional state of the user.

According to another aspect of the present invention, there is provided a method of reasoning an optimized service of a ubiquitous system, the method including: collecting information about surroundings of a user; recognizing a state of the user based on the collected information, and generating context information; recognizing an emotion of the user based on the collected information, and generating emotion information; combining the context information and the emotion information; and reasoning and selecting a service for the user based on the combination result.

A method and system using a processor for reasoning an optimized service of a ubiquitous system using context information and emotion awareness may determine an emotion as well as a state of a user such as a location or a motion of the user, and provide the user with a service, required for the user, based on the emotion and state of the user.

Additional aspects, features, and/or advantages of the invention will be set forth in part in the description which follows and, in part, will be apparent from the description, or may be learned by practice of the invention.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which:

FIG. 1 is a block diagram illustrating a configuration of a system using a processor for reasoning an optimized service of a ubiquitous system according to an example embodiment; and FIG. 2 is a flowchart illustrating a method of reasoning an optimized service of a ubiquitous system according to an example embodiment.

DETAILED DESCRIPTION

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a block diagram illustrating a configuration of a system 100 using a processor for reasoning an optimized service of a ubiquitous system according to an example embodiment.

Referring to FIG. 1, the system 100 using a processor for reasoning an optimized service of a ubiquitous system unit 110, hereinafter, referred to as a reasoning system 100, may include the ubiquitous system unit 110, a context awareness unit 120, a context interpretation unit 130, an emotion awareness unit 140, a characteristic determination unit 150, a combination unit 160, and a service selection unit 170.

The ubiquitous system unit 110 may collect information about surroundings of a user using a ubiquitous device around the user, and provide the user with a service. The ubiquitous system unit 110 may include a sensor network 111 and a user interface 112.

In this instance, the sensor network 111 may collect state-related information associated with a state of the user. The state-related information may include at least one of identification information of the user, a location of the user, a motion of the user, and environment information.

That is, the sensor network 111 may collect information about who, where, what, and how in the ubiquitous system unit 110.

Also, the user interface 112 may collect at least one piece of emotion expression information expressing the emotion of the user. The emotion expression information may include at least one of facial expression information of the user and voice information of the user.

In this instance, the emotion expression information may be used to identify which emotion the user feels. According to an example embodiment, a facial expression and voice may be used since the facial expression and voice vary depending on emotion change. However, when the user makes a predetermined motion when the user feels a predetermined emotion, other information may be further collected to identify the motion.

For example, when a user usually throws a pillow onto a bed when the user is upset, or when the user usually wiggles the user's legs when nervous, it may be ascertained whether the user throws a pillow using a sensor sensing a location of the pillow and the bed and a movement around the bed, and whether the user wiggles the user's legs on a chair using a sensor sensing the chair.

The context awareness unit 120 may recognize the state of the user based on the information, collected in the ubiquitous system unit 110, and information, provided by the context interpretation unit 130, and thereby may generate context information.

In this instance, the context awareness unit 120 may provide information to divide types of the state-related information collected in the sensor network 111.

That is, when the context interpretation unit 130 provides information about which one of Four Ws and one H (Who? What? When? Where? and How?) the state-related information corresponds to, the context awareness unit 120 may combine the state-related information based on the Five Ws and one H, and recognize the location and the motion of the user, and generate the recognized information as the context information.

Also, the context recognition unit 120 may recognize the state of the user by applying a likelihood-based inference using a Bayesian network to the information, collected in the ubiquitous system unit 110, and the information, provided by the context interpretation unit 130, and thereby may generate the context information.

The emotion awareness unit 140 may recognize an emotion of the user based on the information, collected in the ubiquitous system unit 110, and information, provided by the characteristic determination unit 150, and thereby may generate emotion information.

In this instance, the characteristic determination unit 150 may determine characteristic information for each emotion. Here, the characteristic information may be used to determine which emotion the user feels. Accordingly, the emotion awareness unit 140 may recognize an emotion corresponding to the characteristic information, which is most similar to the emotion expression information collected in the user interface 112, as the emotion of the user.

Also, the emotion awareness unit 140 may recognize the emotion of the user by applying a likelihood-based inference using a Bayesian network to the emotion expression information, collected in the ubiquitous system unit 110, and the characteristic information, provided by the characteristic determination unit 150, and thereby may generate the emotion information.

For example, in the reasoning system 100, when a user expresses his or her emotion such as joy, anger, sorrow, pleasure, and the like, the user interface 112 may collect emotion expression information about a facial expression or a voice of the user in a state that the user expresses user's emotion, and the characteristic determination unit 150 may store the emotion expression information and determine characteristic information for each emotion based on the stored emotion expression information.

For another example, in the reasoning system 100, voice change information or expression change information depending on emotion changes of a plurality of users may be collected, and the characteristic determination unit 150 may store the voice change information or expression change information, extract common information for each emotion from the stored voice change information or expression change information, and determine characteristic information for each emotion.

Also, the characteristic determination unit 150 may provide the emotion awareness unit 140 with the characteristic information using a characteristic combination-based multi model.

The combination unit 160 may combine the context information, recognized by the context awareness unit 120, and the emotion information recognized by the emotion awareness unit 140. In this instance, the combination unit 160 may combine the context information and the emotion information based on a likelihood-based inference using a Bayesian network.

The service selection unit 170 may reason and select a service suitable for the user based on the combination result of the combination unit 160. For example, when the emotion awareness unit 140 recognizes user's sorrow or user's anger, the service selection unit 170 may provide a service to enable the user to feel pleasure by providing an image, a video, or music that the user likes using a device in the ubiquitous system unit 110.

FIG. 2 is a flowchart illustrating a method of reasoning an optimized service of a ubiquitous system according to an example embodiment.

In operation S201, the characteristic determination unit 150 may determine characteristic information for each emotion. The characteristic information may be used to determine which emotion a user feels.

Specifically, when the user expresses his or her emotion such as joy, anger, sorrow, pleasure, and the like, the user interface 112 may collect emotion expression information about a facial expression or a voice of the user in a state that the user expresses emotion, and the characteristic determination unit 150 may store the emotion expression information and determine characteristic information for each emotion based on the stored emotion expression information.

For another example, voice change information or expression change information depending on emotion changes of a plurality of users may be collected, and the characteristic determination unit 150 may store the voice change information or expression change information, extract common information for each emotion from the stored voice change information or expression change information, and determine characteristic information for each emotion.

In operation S202, the ubiquitous system unit 110 may collect information about surroundings of the user using a ubiquitous device around the user. Specifically, the sensor network 111 of the ubiquitous system unit 110 may collect at least one piece of state-related information associated with a state of the user. Also, the user interface 112 of the ubiquitous system unit 110 may collect at least one piece of emotion expression information expressing the emotion of the user.

In operation S203, the context awareness unit 120 may recognize the state of the user based on the state-related information collected in operation S202, and generate context information. Specifically, the context awareness unit 120 may recognize a location and a motion of the user and how the user acts by combining the state-related information, and thereby may generate the context information as the recognized information.

In operation S204, the emotion awareness unit 140 may compare the characteristic information, determined in operation S201, with the emotion expression information, collected in operation S202, recognize a current emotional state of the user, and thereby may generate emotion information as the recognized emotional state of the user.

In operation S205, the combination unit 160 may combine the context information, generated in operation S203, and the emotion information generated in operation S204. Specifically, the combination unit 160 may combine the context information and the emotion information based on a likelihood-based inference using a Bayesian network.

In operation S206, the service selection unit 170 may reason and select a service appropriate for the user based on the combination result obtained in operation S205.

As described above, the method and system for reasoning an optimized service of a ubiquitous system using context information and emotion awareness may recognize an emotion of a user as well as a state of the user such as a location or motion of the user, and thereby may provide a service suitable for the user based on the emotion and the state of the user.

For example, when a user feels happy, the method and system may enable a lighting to be brighter based on a user's preference to make the user feel happier, and when the user is crying in his or her bed around a stereo, the method and system may enable the stereos to replay a song for comfort. Also, when the user is sitting exhausted on a couch in a living room where a television is located, the method and system may enable the television to display a user's favorite channel to make the user feel better.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A system using a processor for reasoning an optimized service for influencing the emotive state of a user, the system comprising:
    a ubiquitous system unit for collecting information about surroundings of a user, and for storing the information in database;
    a context awareness unit for recognizing a state of the user based on the information collected by the ubiquitous system unit, and for generating context information;
    a characteristic determination unit for determining characteristic information for each emotion, the characteristic information being used to determine which emotion the user feels;
    an emotion awareness unit for comparing the characteristic information with the at least one piece of emotion expression information, for recognizing a current emotional state of the user, and for generating emotion information;
    a combination unit for combining the context information and the emotion information; and
    a service selection unit for reasoning and selecting a service for influencing the emotive state of the user based at least in part on the combination result of the combination unit,
    wherein the ubiquitous system unit includes
        a sensor network for collecting state-related information associated with the state of the user; and
        a user interface for collecting at least one piece of emotion expression information expressing the emotion of the user.

2. The system of claim 1, wherein the state-related information includes at least one of identification information of the user, a location of the user, a motion of the user, and environment information.

3. The system of claim 1, wherein the emotion expression information includes at least one of facial expression information of the user and voice information of the user.

4. The system of claim 1, wherein the characteristic determination unit measures and stores the emotion expression information for each emotion expressed by the user, and determines the characteristic information for each such emotion based on the measured emotion expression information.

5. The system of claim 1, wherein the characteristic determination unit measures and stores emotion expression information for each emotion of a plurality of users, extracts common information of each of the emotions based on the emotion expression information of the plurality of users, and determines characteristic information for each emotion based on the common information.

6. A system using a processor for reasoning an optimized service for influencing the emotive state of a user, the system comprising:
    a ubiquitous system unit for collecting information about surroundings of a user;
    a context awareness unit for recognizing a state of the user based on the information collected by the ubiquitous system unit, and for generating context information;
    an emotion awareness unit for recognizing an emotion of the user based on the information collected by the ubiquitous system unit, and for generating emotion information;
    a combination unit for combining the context information and the emotion information; and
    a service selection unit for reasoning and selecting a service for influencing the emotive state of the user based at least in part on the combination result of the combination unit,
    wherein the combination unit combines the context information and the emotion information based on a likelihood-based inference using a Bayesian network.

7. A method of reasoning an optimized service of a ubiquitous system, the method comprising:
    collecting state-related information associated with the state of the user;
    collecting at least one piece of emotion expression information expressing the emotion of the user;

recognizing a state of the user based on the collected information, and generating context information;

determining characteristic information for each emotion of the user, the characteristic information being used to determine which emotion the user feels;

comparing the characteristic information with the collected emotion expression information;

recognizing a current emotional state of the user, and generating emotion information;

combining the context information and the emotion information; and reasoning and selecting a service for influencing the emotive state of the user based on the combination result.

8. The method of claim 7, wherein the state-related information includes at least one of identification information of the user, a location of the user, a motion of the user, and environment information.

9. The method of claim 7, wherein the emotion expression information includes at least one of facial expression information of the user and voice information of the user.

10. The method of claim 7, wherein the determining of the characteristic information comprises: measuring and storing the emotion expression information for each emotion; and determining the characteristic information for each emotion based on the measured emotion expression information.

11. The method of claim 7, wherein the determining of the characteristic information comprises: measuring and storing emotion expression information for each emotion of a plurality of users; extracting common information of each of the emotions based on the emotion expression information of the plurality of users; and determining characteristic information for each emotion based on the common information.

12. A method of reasoning an optimized service of a ubiquitous system, the method comprising:

collecting information about surroundings of a user;

recognizing a state of the user based on the collected information, and generating context information;

recognizing an emotion of the user based on the collected information, and generating emotion information;

combining the context information and the emotion information; and reasoning and selecting a service for influencing the emotive state of the user based on the combination result, wherein the combining combines the context information and the emotion information based on a likelihood-based inference using a Bayesian network.

* * * * *